Nov. 12, 1935.    L. LANDÉ    2,021,011
MIXING JAR
Filed July 27, 1935
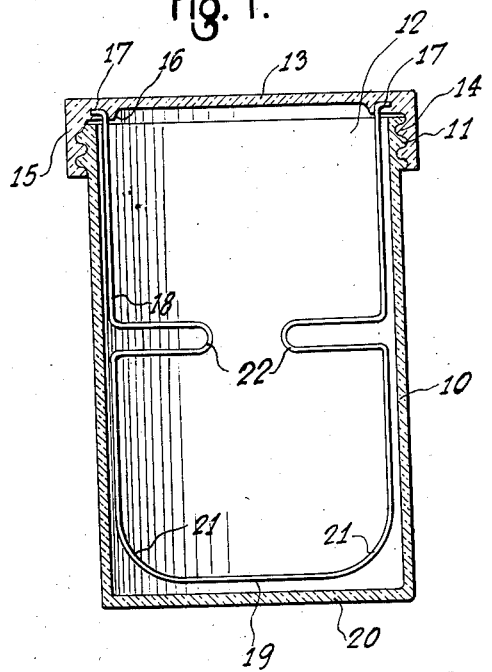
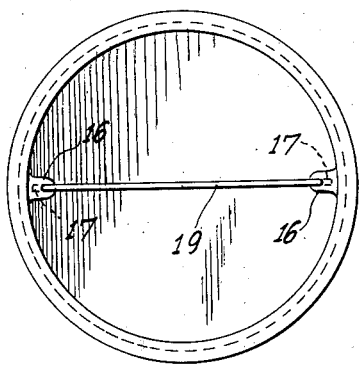
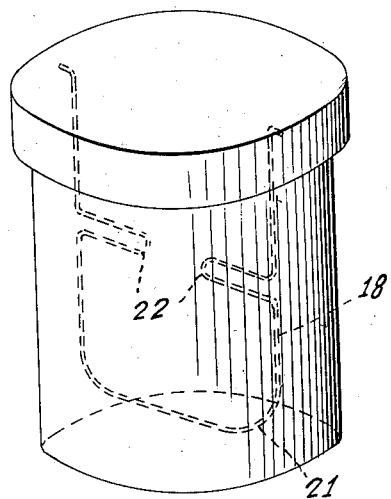
INVENTOR.
L. Landé
BY F. Ledermann
ATTORNEY.

Patented Nov. 12, 1935

2,021,011

UNITED STATES PATENT OFFICE 2,021,011

MIXING JAR

Lillie Landé, Astoria, N. Y., assignor to Marguerite Keidel, Spring Valley, N. Y.

Application July 27, 1935, Serial No. 33,447

1 Claim. (Cl. 259—72)

One object of this invention is the provision of a jar to be used for mixing culinary flour or other powdered substances with water or other liquids, to be used in the preparation of gravies and sauces. By means of this jar a thorough mixing of the substances is attained, such as is impossible by the ordinary methods. In the case of gravies or sauces which are the usual accompaniment of meat roasts, and which contain flour, the mixing of the flour and water is so thorough that it prevents any lumping of the flour in the gravy.

A further object of the invention is the provision of a jar having a removable cover provided with a loop of wire or the like projecting from the cover into the jar, the loop serving as a means for completely and homogeneously mixing the contents upon shaking of the jar.

The above and other objects will become apparent in the description below, in which characters of reference refer to like-named parts in the accompanying drawing, forming a part hereof.

Referring briefly to the drawing, Figure 1 is a longitudinal sectional elevational view of the jar.

Figure 2 is a bottom plan view of the jar cover detached from the jar.

Figure 3 is a perspective view of the complete jar.

Referring in detail to the drawing, the numeral 10 represents the body of the jar, the same being provided with a threaded periphery 11 about its mouth 12. A cover 13 is provided with internal threads 14 on its depending flange 15, the threads 14 and 11 mutually engaging to lock the cover on the jar.

On the underside of the cover 13, a pair of diametrically opposed lugs 16 are provided integral with the cover. Imbedded in these lugs are the bent ends 17 of a substantially U-shaped loop 18 of wire or the like. The bas 19 of the loop 18 passes at a distance above the bottom 20 of the jar, and the sides of the loop extend at a lesser distance from the walls of the jar. The corners 21 of the loop are rounded. Since the loop 18 is firmly secured to the cover 13, it is to be noted that the loop is removed with the cover, and hence the loop may be readily cleansed. Intermediate the sides of the loop 18 and integral therewith, a pair of oppositely disposed fingers 22 are formed, which project radially inward toward the center of the jar, but do not meet.

In use, the various ingredients to be mixed are poured into the open jar, then the loop 18 is inserted into the jar and the cover 13 is screwed on. A washer, not shown, may be provided at a suitable place about the mouth 12, if desired. The jar is then shaken, and the constant interruption of the loop 18 to the passage of the contents within the jar, thoroughly divides the contents, especially any powdered material such as flour, thus assuring the mixing of the contents into a thoroughly homogeneous fluid. The fingers 22 serve to cut and divide the flour and water mixture more thoroughly.

Obviously, modifications in form and structure may be made without departing from the spirit of the invention.

I claim:

A device of the class described comprising a jar having a mouth, a cover adapted to be mounted thereon, lugs integral with the underside of said cover, a substantially U-shaped loop of wire having its ends imbedded in said lugs, said loop extending down into said jar when said cover is mounted thereon, the sides of said loop having oppositely disposed fingers integral therewith extending radially toward each other.

LILLIE LANDÉ.